United States Patent [19]

Jacobs

[11] 3,988,902
[45] Nov. 2, 1976

[54] REFRIGERATOR WITH ADD-ON ICE CREAM MAKER

[75] Inventor: James W. Jacobs, Dayton, Ohio

[73] Assignee: General Motors Corporation, Detroit, Mich.

[22] Filed: Nov. 28, 1975

[21] Appl. No.: 635,886

[52] U.S. Cl. ................................. 62/136; 62/342
[51] Int. Cl.² ............................................ A23G 9/00
[58] Field of Search ............. 62/136, 342; 192/84 C

[56] References Cited
UNITED STATES PATENTS

| | | | |
|---|---|---|---|
| 2,116,002 | 5/1938 | Shaw | 62/136 |
| 2,757,550 | 8/1956 | Weinfurt | 74/472 |
| 2,849,868 | 9/1958 | Anderson | 62/342 |
| 3,108,449 | 10/1963 | Lents | 62/136 X |

Primary Examiner—William E. Wayner
Attorney, Agent, or Firm—Edward P. Barthel

[57] ABSTRACT

An automatic ice cream maker appliance for use in the freezer compartment of a domestic refrigerator including a front air intake wherein the ice cream maker fan draws freezer air therethrough for flow over the mixing tray and mix to be frozen and thence over the rearward agitator and fan motor drive unit for exhaustion from rear air outlet means. Air duct means are provided in the refrigerator cabinet for receiving the exhausted air for passage into the fresh food compartment. A circuit control system operates to place the agitator in a vertical position upon the appliance being in its "cooling" mode with the fan continuing its operation, while a neon signal lamp is switched from an "off-on" flashing mixing mode to a "full on" indicating that the mixing cycle has been completed.

4 Claims, 15 Drawing Figures

REFRIGERATOR WITH ADD-ON ICE CREAM MAKER

This invention relates to automatic ice cream makers and more particularly to an automatic ice cream maker accessory appliance for use in the freezer compartment of a household refrigerator.

With reference to my copending U.S. patent application Ser. No. 552,429, filed Feb. 24, 1975, now U.S. Pat. No. 3,952,534 entitled Ice Cream Maker for Refrigerator, there is disclosed an "add-on" ice cream maker accessory appliance for use in a domestic refrigerator which provides for the automatic preparation of ice cream or similar confection within the refrigerator freezer compartment. The automatic ice cream maker of the above-mentioned patent application has self-contained fan means operative for drawing below-freezing air directly from the freezer compartment air supply through rear air inlet means of the appliance housing for passage into its mixing chamber in heat exchange relation with the confection, after which the air is discharged through outlet means in the housing front for discharge into the freezer compartment. The present invention has as one of its objects to provide an automatic frozen confection making appliance which may be used in the freezer compartment of a household refrigerator as either an add-on optional appliance for a conventional refrigerator or an apparatus which may be used with a custom designed side-by-side refrigerator cabinet incorporating ducting and control means for air expelled from the apparatus.

It is another object of the present invention to provide an automatic ice cream making appliance for use in a freezer compartment of a refrigerator wherein air from the freezer compartment is drawn through front wall air inlet means of the appliance for passage over the mixing tray and mix therein where the air is heated and after which the air is passed through the rear motor drive chamber where the air temperature is further increased after which it is exhausted from rear exit means from the ice cream maker where it is recirculated in the refrigerator freezer compartment.

It is another object of the present invention to provide an automatic ice cream maker unit in combination with a side-by-side refrigerator having a below-freezing compartment, an above-freezing compartment and a refrigeration system wherein the ice cream maker incorporates fan means for drawing freezer air from the refrigeration system circulated in the below-freezing compartment into air inlet means in the unit front wall for passage of the air over a mixing tray and mix and thence over combined dasher and fan prime mover means whereby said freezer air is raised in temperature, and means for discharging said air through rear air outlet means in the unit communicating with damper controlled duct means in the refrigerator cabinet directing the air into the fresh food compartment where its cooling capacity can be utilized before it is subsequently returned to the freezer compartment for passage over evaporator means located therein.

It is another object of the present invention to provide an electrical control system for an automatic ice cream maker for incorporation in the freezer compartment of a domestic refrigerator which positions the mixing dasher in a vertical position when the ice cream maker's control is placed in its "cooling" mode of operation wherein the fan means will continue to operate cooling the mix while a signal lamp is changed from a flashing sequence denoting the mixing mode to a continuously energized state denoting the mix cooling mode wherein the fan continues to draw freezer air over the mix to lower its temperature and harden its consistency.

It is still another object of the present invention to provide an automatic ice cream mixing unit for a domestic refrigerator having a control system therefor wherein the oscillating dasher member of the mixing tray will stop in its vertical position for easy removal despite the fact that the unit's on-off switch is moved to an "off" position during any phase of its oscillating cycle.

These and other objects and advantages of the present invention will become apparent from the following description, reference being had to the accompanying drawings wherein a preferred embodiment of the invention is clearly shown.

Figure 1:
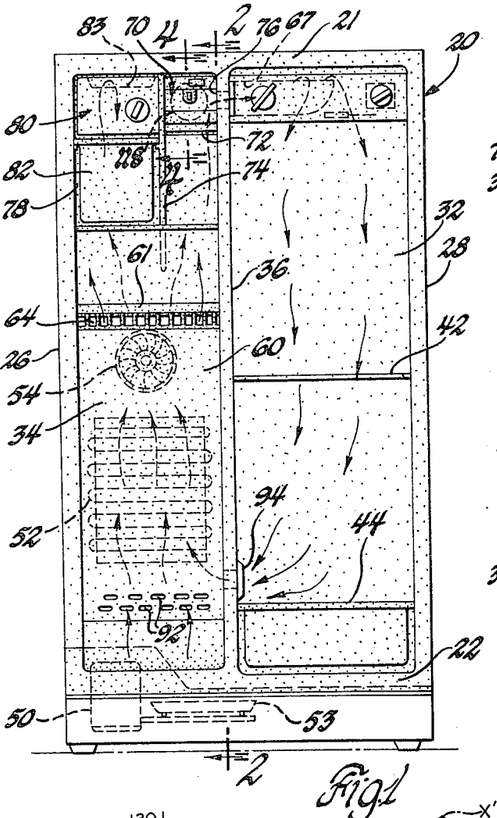
FIG. 1 is a front view of a side-by-side domestic refrigerator with the doors omitted, showing one form of my invention.
Figure 2:
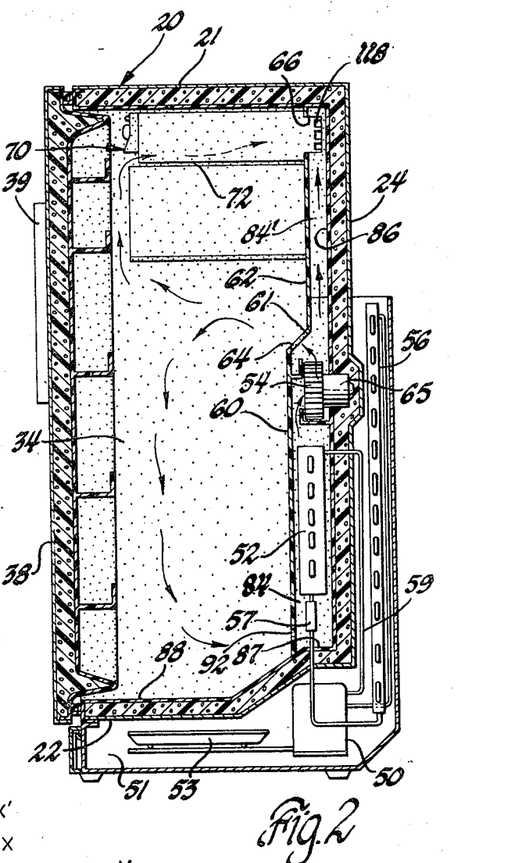
FIG. 2 is a vertical sectional view of the refrigerator taken substantially along the line 2—2 of FIG. 1.

Referring now to the drawings and in particular to FIGS. 1 and 2, there is shown a side-by-side domestic refrigerator comprising an insulated cabinet 20 of vertically elongated form of conventional construction formed by an outer metal shell and inner plastic liner separated by rigid foam insulation providing top and bottom walls 21 and 22, a rear wall 24 and side walls 26 and 28. The interior of the refrigerator cabinet is divided into a fresh food compartment 32 and a frozen food or freezer compartment 34 by a vertical insulated divider wall or separator 36 which extends from the top to the bottom and from front to rear of the cabinet. The fresh food compartment is closed by an insulated door (not shown) and the left hand freezer compartment 34 is closed by a separate insulated door shown at 38 in FIG. 2 including a handle member 39 with each of the doors extending from top to bottom of the refrigerator cabinet.

The fresh food compartment is provided with conventional racks 42 and bottom drawer storage means 44 while the freezer compartment has similar shelves and containers which have been omitted for clarity. The refrigeration system includes a compressor 50, located in bottom machinery compartment 51 of the refrigerator, evaporator coil 52 and interior blower or fan 54 and a condenser assembly 56 which is located in spaced relation from the rear wall 24 of the refrigerator as seen in FIG. 2. The compressor 50 delivers refrigerant to series-connected condenser 56, the refrigerant then passing through a capillary tube 57, then to the evaporator 52, and returns via tube 59 to the inlet side of the compressor 50. A defrost water pan 53 is provided in the machinery compartment 51.

The evaporator coil 52 is positioned directly behind a relatively thin vertical plastic panel or inner rear wall portion 60 is spaced forwardly of the liner back wall and is offset inwardly at portion 61 forming an upper rear wall portion 62. The wall portions 60, 61 and 62 extend completely across the rear of the freezer compartment 34 and from the bottom to the top of the compartment. The offset wall portion 61 is provided with louvered freezer air outlets 64 above the fan 54 whose motor 65 is suitably supported in the cabinet rear wall 24. At its upper end the wall 62 has an aperture 66 formed therein communicating with a crossover over duct passage 67, extending through partition 36, directing freezer air into the food compartment 32. The aperture 66 is closed upon receiving the reduced cylindrical enclosure 118 of applicant's automatic ice cream maker appliance, generally indicated at 70. The appliance 70 is supported on freezer compartment upper shelf 72 on the right hand side of the vertical freezer partition 74. Partition 74 thus divides the upper portion of the freezer compartment 34 into ice cream making chamber 76 and ice cube making compartment 78. The ice cube forming apparatus is preferably an automatic ice maker 80 having an ice storage bucket 82 subjacent thereto. An example of an automatic ice maker is found in U.S. Pat. No. 3,601,145 to C. W. Eyman, Jr., et al., an air inlet for which is shown at 83 in FIG. 1. An upper portion 87' of freezer air channel 84, formed between the upper rear wall 62 and the cabinet liner back wall 86, conducts fan driven freezer air upwardly into crossover passage 67. Channel 84 has its lower end closed by stepped-up portion 87 of the liner bottom wall portion 88. In order to form a collector for moisture removed from the evaporator coil a suitable defrost water drain trap (not shown) may be provided in lower liner wall portion 88 as shown in U.S. Pat. No. 3,696,632 issued Oct. 10, 1972 to Carlin et al. and assigned to the same assignee as the present application.

Figure 5:
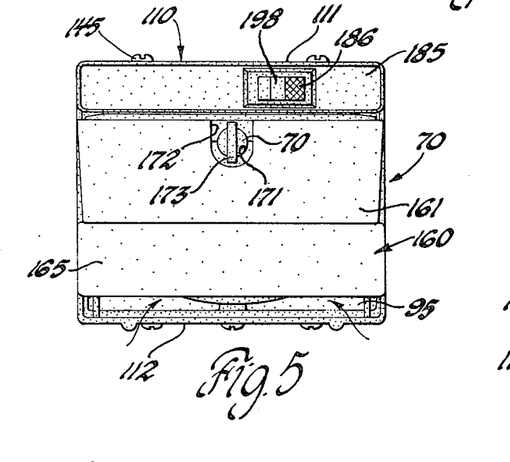
FIG. 5 is a front elevational view of the ice cream maker.
Figure 6:
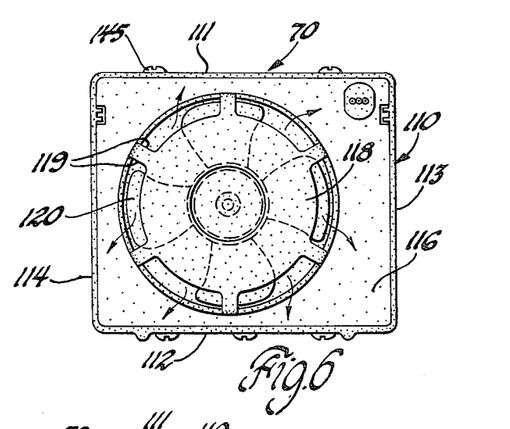
FIG. 6 is a rear elevational view of the ice cream maker.

The otherwise closed lower end of the air channel 84 is provided with a plurality of elongated freezer compartment air inlet openings 92 positioned beneath the lower end of the evaporator coil 52. Operation of the fan 54 draws food compartment air through its lower air outlet passage 94 in partition 36 into channel 84 and thence over evaporator 52 upwardly through the channel 84 for delivery to the freezer compartment 34 through the freezer compartment air outlet 64 for movement upwardly into the ice cream maker via its front air inlet opening shown at 95 in FIG. 5.

Figure 4:
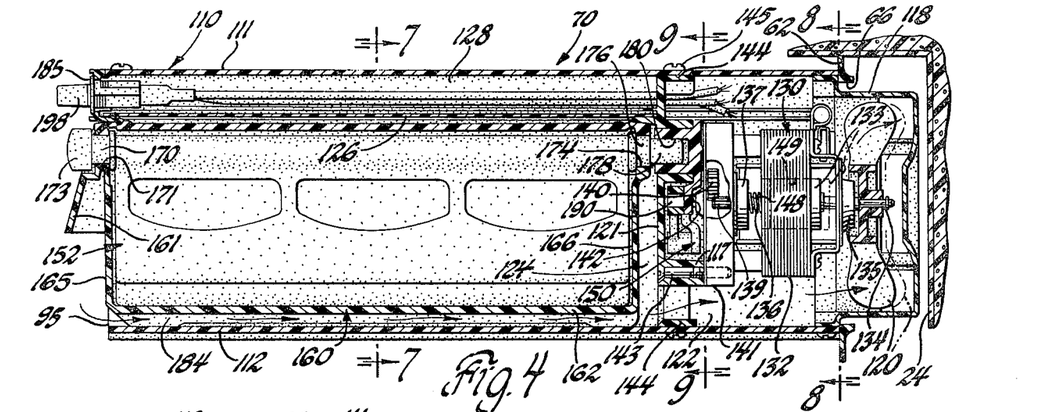
FIG. 4 is an enlarged partial vertical sectional view of the ice cream maker of FIG. 2, taken on the line 4—4 of FIG. 1.

With reference now to FIGS. 4–8, the automatic ice cream maker assembly 70 is shown, including an outer rectangular housing 110, including a top wall 111, a bottom wall 112, side walls 113 and 114 and a rear wall 116 having a rearwardly extending integral cup-shaped enclosure 118, formed with circumferential air outlets 119, concentrically shrouding ice cream maker fan means which in the preferred form is an axial fan 120. As best seen in FIGS. 4, the housing 110 includes an intermediate partition wall or barrier 121, with integral motor mounting bosses 117, which wall divides the housing into a rear machinery compartment or chamber 122, and a front freezing and mixing chamber 124. The forward mixing chamber 124 of the housing 110 includes a horizontally disposed top plate 126 defining an upper electrical control chamber 128 with the housing top wall 111.

As seen in FIG. 4, the motor compartment 122 encloses a power assembly in the form of an electrical drive motor, generally indicated at 130, including motor windings 131 (FIG. 8) and motor stator 132, together with a motor rotor 133. The motor rotor 133 has a rearwardly extending shaft portion 134 supported in rear journal bearings 135 and a forwardly extending shaft portion 136 supported in front journal bearings 137, allowing the rotor to move axially under the influence of the stator magnetic field. The front shaft portion 136 has a pinion gear 139 secured on its forward end which functions as clutching gear means for driving engagement with a spur gear 140, located in gear box 141 having a forwardly extending output drive shaft 142. The gear box 141 and motor 130 are connected by screws 138 to define a drive unit supported by four screws 143 threaded in the gear box 141, with wall 121 having peripheral flanges 144 suitably affixed as by screws 145 to the housing walls. Gear box 141 provides a step down gear reduction with its forwardly extending drive shaft 142, FIGS. 9 and 11, journaled in bearing means 146 formed in cover 147 of the gear box 141 for connection, via mechanical linkage arrangement 150, to dashing means in the form of dasher or mixer 152 to provide oscillatory or agitating movement about the dasher longitudinal axis in a manner to be described.

Figure 7:
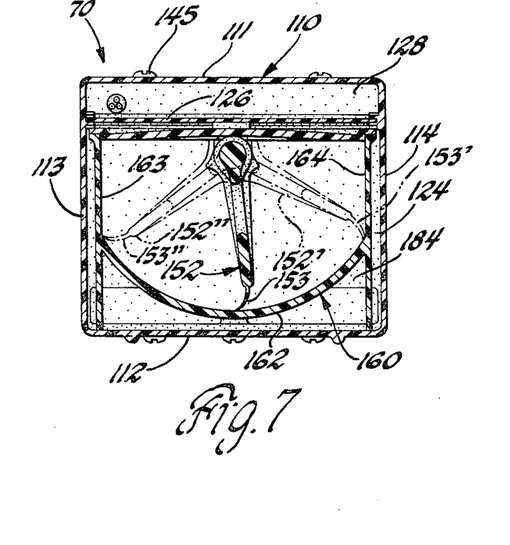
FIG. 7 is a vertical sectional view taken on the line 7—7 of FIG. 4.

As seen in FIGS. 4 and 7, a mixing receptacle or tray, generally indicated at 160, is dimensioned to be slidably received in the front end opening of the housing 110. The mixing tray 160 is preferably made of plastic material, such as polypropylene, providing a one-piece or integral tray and handle member 161 which handle allows the user to grip the tray for easy sliding removal from the housing. The tray 160 is generally box-shaped in configuration having an arcuate shaped bottom wall 162 merging with vertical side walls 163 and 164 with the tray having substantially rectangular upright front and rear walls 165 and 166 respectively.

Figure 12:
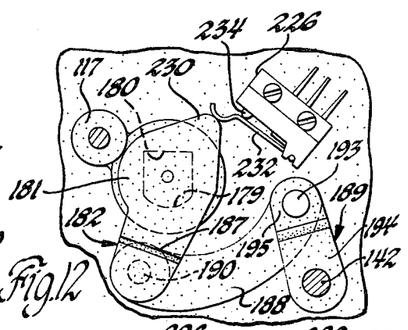
FIG. 12 is an enlarged fragmentary elevational view of a modified drive mechanism and positioning switch.

The longitudinally extending dasher 152 is pivotally removably supported within the tray 160 for oscillatory movement about a longitudinal axis extending through integral forward hub member 170 supported in a journal fashion and centrally located semi-circular bearing 171, defined in part by a lead-in slot 172 in the tray front wall 165, with the hub 170 including an indicating and finger gripping portion 173. The tray rear wall 166 has a semi-circular aperture 174 formed therein for the journal reception of dasher rear hub 176. Male coupling means, in the form of an integral stem portion 178, extends rearwardly from the dasher rear hub 176 and is formed with a generally rectangular cross section as best seen in FIG. 12. The dasher stem 178 has a generally rectangular section including a lower arcuate wall portion which is removably telescoped or coupled in a female drive socket 180, with a conforming arcuate surface 179, integrally molded in the hub portion 181 of dasher drive arm 182, to be described.

As set forth in applicant's co-pending patent application. Ser. No. 552,429, an important feature of his automatic ice maker is to whip air into the confection being mixed in the tray while it is undergoing its cooling phase to impart smoothness, texture and to a degree taste to the mix while also increasing its volume. In the present invention this is accomplished by oscillating the dasher 152 through a defined arc which in the disclosed form is an angle of about 110°, while the fan 120 pulls freezing air from the refrigerator freezer compartment through the forward air inlet means 95 and through longitudinal air passage 184 (FIG. 4) chilling the mixing tray and consequently the mix therein. The dasher 152 whips the mix to thereby aid the cooling process until the desired texture of the confection being mixed is achieved. At this point control means, to be described, operate to automatically stop the dasher while continuing to operate the fan 120 until the desired mix "hold" temperature is attained. A control panel 185, located at the forward upper end of the unit, includes indicating means supported therein, shown in FIG. 5 by lens 186 for neon lamp 229 which when continuously aglow indicates that the mix is ready for serving.

Figure 9:
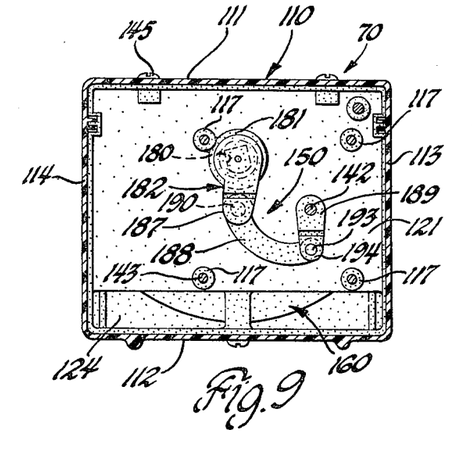
FIG. 9 is a vertical sectional view taken along the line 9—9 of FIG. 4.
Figure 10:
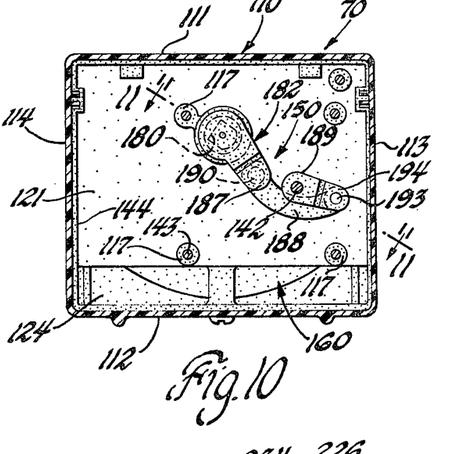
FIG. 10 is a view similar to FIG. 9 with the dasher drive mechanism moved to a different position.
Figure 11:
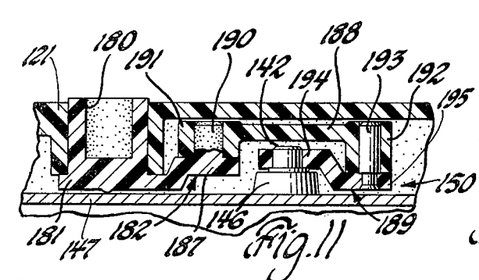
FIG. 11 is an enlarged fragmentary sectional view taken along the lines 11—11 of FIG. 10.

The drive arrangement for the ice cream maker dasher 152 involves the novel disposition of the motor 130 and transmission through the releasable coupling means of members 178 and 180, by means of a drive train including driven gears in the gear box 141 and the mechanical linkage 150. As seen in FIGS. 9-11, the linkage 150 consists of three positions: (1) the dasher drive arm 182, including offset extension 187; (2) connecting curved link 188; and (3) gear box output crank arm 189. One end of the connecting curved link 188 has a large integral bushing 191 while its other end has a small integral bushing 192. Thus curved link 188 is pivotally connected by pivot pin 190 molded on the drive arm offset extension 187, with pin 190 being received in the large bushing 191. The other end of the curved link 188 is secured by its smaller bushing 192 receiving pivot pin 193, located on rearwardly offset portion 195 of the crank arm 189, with its forwardly offset portion 194 being fixed to the gear box output drive shaft 142.

By virtue of the disclosed arrangement of parts as the drive shaft 142 rotates the output crank arm 189 in a first direction, as a result of the rotary movement imparted by the output drive shaft 142, the curved link member 188 will cause the oscillatable drive arm 182 to rock about the axis of its hub socket 180. As the mating dasher stem 178 is keyed or locked in socket 180 the dasher 152 will be continuously swung from side-to-side between its two extreme positions, as illustrated in FIG. 7, wherein the dasher 152 has imparted thereto the desired oscillatory motion. As viewed in FIG. 7, the dasher 152 has the edge of its curved plastic blade 153 rotated clockwise through about a 55° arc from its one phantom line position at 153' to its vertical mid-position 153, shown by full lines, and thence to its second phantom line position 153'' and returned to position 153' to complete the oscillation cycle imparted by the 360° rotation of the output crank arm 189. With reference to FIGS. 9 and 10 it can be seen that counterclockwise rotation of the crank arm 189, as a result of the rotation imparted thereto by drive shaft 152, produces through the curved link 188 and the dasher drive arm 182 the dasher's total oscillating motion of about 110° of arcuate travel.

By mounting the motor rotor rear shaft portion 134 and front shaft portion 136 in journal bearings 135 and 137, respectively, the armature drive shaft or rotor 133 is thereby permitted to move freely in an axial direction under the influence of the magnetic field of the laminated stator 132 such that the rotor declutching spring 148 normally biases the armature of motor rotor 133 in a declutched rearward position partially out of the stator bore opening to a dashed line position shown in FIG. 4. Clutch action is thus provided by virtue of the rotor moving axially forwardly into the stator bore 149 causing nylon pinion gear 139, having a chamfered end, to engage its mating drive or spur gear 140. In this manner when full voltage is applied to the motor windings the maximum magnetic force is achieved and the rotor 133 moves fully to the left, as viewed in FIG. 4, to provide clutching action and drive the gear members in gear box 141 and consequently the output drive shaft 142 so as to oscillate the coupled dasher 152 via the linkage arrangement 150 just described.

When partial voltage is applied to the motor windings 131 a reduced magnetic force is insufficient to move the motor 133 axially to the left against the force of spring 148 and provide the stated clutch action. As a result of the armature remains in its righthand or declutched position and only the fan 120 is rotated to draw refrigerated air into the housing through the front aperture means 95 between the tray and the housing front opening.

Figure 3:
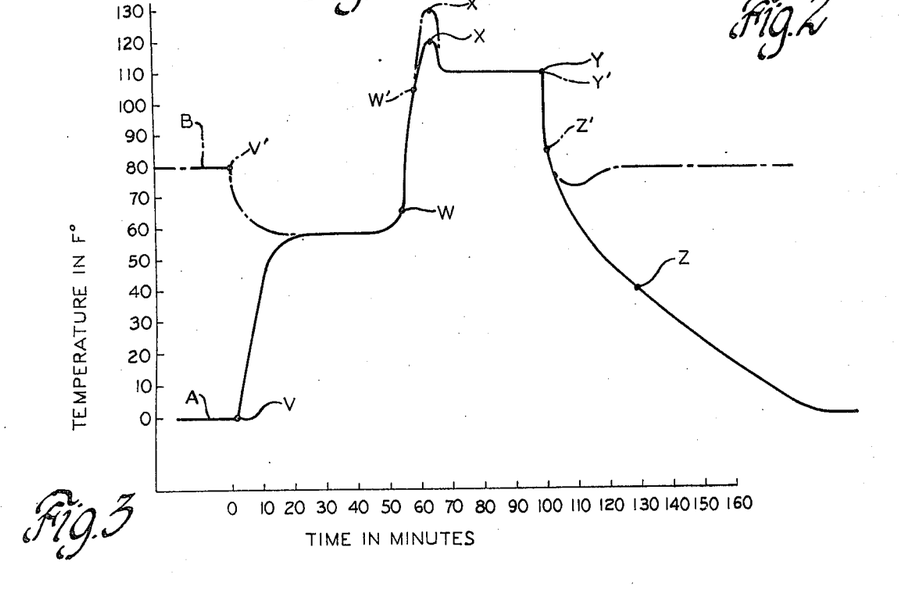
FIG. 3 shows time-temperature curves for the operation of the ice cream maker.
Figure 8:
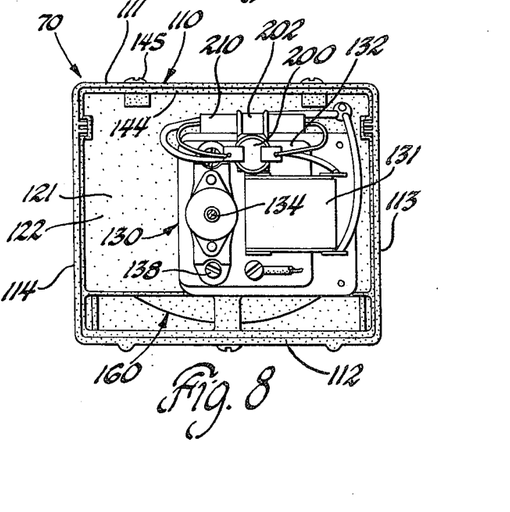
FIG. 8 is a vertical sectional view taken along the line 8—8 of FIG. 4.
Figures 13, 14, 15:
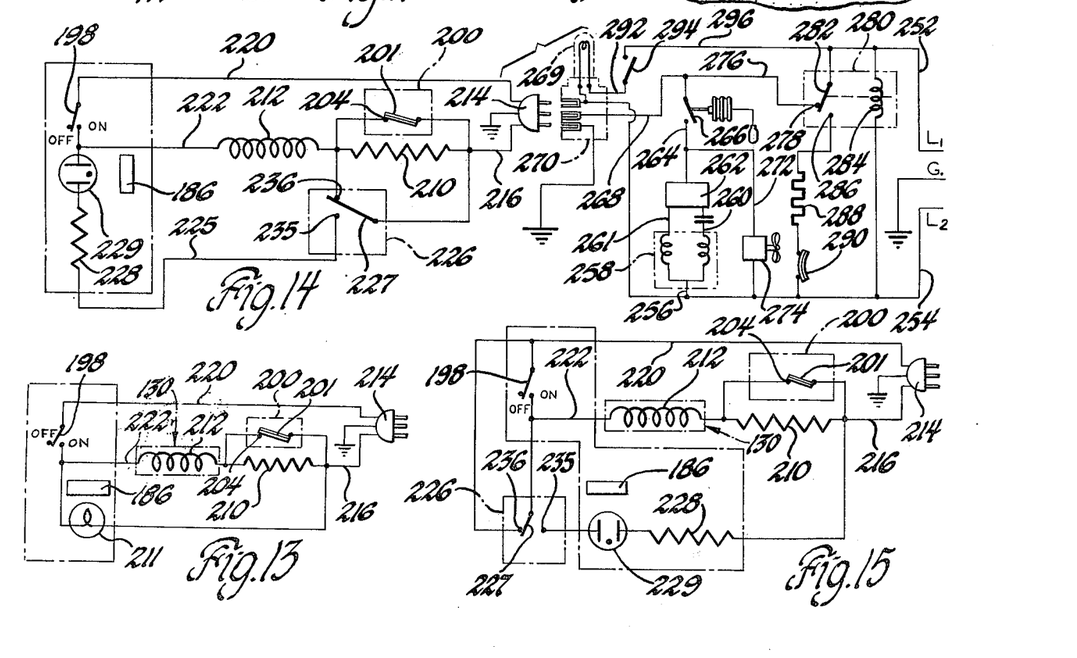
FIG. 13 is a schematic control circuit for the invention.
FIG. 14 is a modified schematic control circuit for the ice cream maker and refrigerator.
FIG. 15 is an alternate schematic for FIG. 14.

The electrical control chamber 128 provides a passageway for suitable control wiring between control means, located in the control panel at the front of the housing, with the control means assembly including on-off switch 198 and the indicator light lens 186, with the leads connected to thermostatic means in the form of a thermostat 200 (FIG. 8) located in the machinery compartment 122 of the housing so as to be mounted in heat transfer relation with the stator laminated plates 132 of the motor by means of a mounting bracket 202. As seen in the schematic of FIG. 13 the thermostat is designed to open from its fixed contact 204 at a predetermined above-freezing temperature, which in the form of the invention represented by curve A of FIG. 3 is about 65° F., and is designed to close at a lower temperature, such as about 40° F. FIG. 8 shows voltage dropping and heat biasing resistor 210 clamped to the bimetal disc thermostat 200 by resistor mounting clip portion of bracket 202 to provide a thermal heat transfer path between resistor 210 and the bimetal thermostat 200.

The schematic of FIG. 13 is the circuitry for electrically operating the various electrical parts of applicant's ice cream mixer disclosed in FIGS. 4-10 in conjunction with the refrigerator. Indicating means, such as an incandescent lamp 211, is wired in the circuit such that upon the operator moving ON-OFF switch 198 to its ON position the lamp 211 will be placed directly across the power source and will be continuously illuminated until the operator moves switch 198 to its OFF position. Thermal switch means in the form of thermostat 200 is operative together with resistor means 210 to make the motor 130 responsive to voltage variations relative to predetermined motor temperatures caused by changes in the consistency of the frozen confection mixture.

FIG. 3 shows two time-temperature curves A and B for two modes of operating of the invention. The mode of operation wherein the ice cream maker is designed to remain in the freezing chamber 76 and identified by curve A will first be described. The time-temperature curve A represents the actual temperature sensed by the thermostat 200. It will be seen that a first substantially horizontal plateau is shown at A which is the temperature thermostat 200 achieves when the ice cream maker remains permanently in the freezing chamber 76 and the ice cream maker has been stabilized to an average temperature of about 0° F. When the user places the mixing tray in the ice cream maker and closes the freezer door 38 the thermostat is initially at point V representing a temperature of 0° F. on curve A. Upon the user turning the switch 198 on the motor 130 is energized while the thermostat temperature 200, which is in intimate thermal contact with the motor laminations 132, begins to rise as the motor starts to generate the power to oscillate the dasher 152. It will be noted that curve A shows a very rapid rise in the first few minutes until the motor temperature reaches a balanced temperature state or second substantially horizontal plateau of about 55° F. after about 10 minutes of operation.

During this phase the ice cream mix is still relatively fluid in consistency and represents very little load on the motor so the rise in thermostat temperature is due to the increase in motor temperature. Curve A shows the motor temperature remaining stable at about 55° for an extended time interval which in the disclosed form is of the order of 30 to 40 minutes. During this time the dasher 152 is beating the semi-fluid ice cream mix while the mix is being cooled by the freezer air entering housing opening 95 and moving through passage 184 in heat exchange relation with the arcuate bottom wall 162 of the tray.

As the mix reaches its critical temperature of about 26° the partly frozen mixture starts to jell and thicken whereby the added load on the dasher to agitate the mix increases the power developed by the motor. As the load of the motor goes up the motor temperature rises to point W on the curve A, which is shown to be about 65° F., causing the thermostat 200 to open. It will be appreciated that as the motor and the dasher are slowed down under the load of the frozen mix the speed of fan 120 is also reduced resulting in less freezer air being drawn through motor chamber 122 from passage 184 causing the motor temperature to rise even more rapidly than normal. This cumulative factor is evidenced by the very rapid increase on slope of curve A from its balanced plateau portion of about 55° F. to point W. The mentioned opening of the thermostat 200 at point W places the series voltage dropping resistor 210 in the control circuit resulting in about one half normal voltage, or about 50 to 60 volts in the disclosed form, being placed across the motor windings 212 so the motor is now working at half voltage. At this point the biasing spring 148 forces the motor armature or rotor 133 in a rearward axial direction disengaging or declutching the pinion drive gear 139 to stop the dashing operation. The fan speed, which during this interval has been slowed down, picks up because the motor speed returns to its normal rotational speed of about 3500–3600 rpm. As the voltage dropping resistor 210 also functions as a heater to bias the thermostat 200, by virtue of being in thermal contact therewith, the thermostat's actual temperature rises rapidly to some elevated point X, indicated by the slope of the curve A to be about 120° F., primarily due to heater 210 driving the thermostat temperature in overshoot fashion to point X. However, because of the increased fan speed, there is presented an offsetting cooling effect causing a drop-off in temperature to a second plateau or balanced temperature, shown on curve A to be about 100° F., that will be maintained as long as the ice cream maker tray is retained in the refrigerator.

Point Y on curve A represents the time at which the user opens the freezer door and turns the switch 198 to its off position deenergizing the motor and stopping the fan 120. With the resistor 210 also deenergized there is a fall-off in temperature of the thermostat because in the curve A mode of operation the ice cream maker is designed to be "permanently" retained in the refrigerator. As the freezer compartment temperature is maintained at about 0° F. the thermostat 200 temperature falls off to point Z, shown on curve A at about 40° F., which is the closing temperature for the thermostat 200. As the circuit of FIG. 13 is deenergized the temperature of the ice cream maker continues to fall until it reaches its initial plateau or balance point of about 0° F. Thus, curve A depicts a cycle for an ice cream maker utilzing thermostat 200 wherein the tray 160 is simply removed by the user, filled with ice cream mix, and reinserted into the unit housing 110 requiring only that the switch 198 be turned on to initiate an ice cream making cycle. It will be appreciated that in the installed mode of operation the unit 70 could be permanently wired into the electrical system of the refrigerator cabinet or have a plugged in connection wherein plug 214 could be connected to a lamp receptacle 270 shown schematically in the modified circuit of FIG. 14.

In a second mode of operation, represented by the time-temperature dashed line curve B of FIG. 3, the ice cream maker is designed with a modified thermostat to provide an add-on or accessory appliance unit wherein the ice cream maker 70 is intended to be normally stored outside the refrigerator cabinet such that upon the user desiring to make a frozen confection such as ice cream the unit 70 is placed in the refrigerator freezer compartment 76 as shown in FIG. 4. In this mode it is obvious that the thermostat 200' temperature will be at approximately room temperature which for purposes of explanation is taken at about 80° F. as shown by point V' on curve B. In other words initial point V' represents the point on curve B where the switch 198 is turned on after the unit has been placed in the freezer, the tray having been filled with ice cream mix. It should be noted that the unit in this form is designed with a power plug 214 (FIG. 14) which may either be plugged into a cabinet receptacle 270 as shown, for example, in the above-mentioned U.S. patent application Ser. No. 552,429 or alternatively in a receptacle separate from the refrigerator cabinet with the power cord exiting the freezer compartment adjacent the door seal.

As the ice cream maker fan 120 starts to operate the temperature of the alternate thermostat 200' falls, as indicated by the dropping portion of the curve B, until it reaches some balanced temperature again about 55°, at which point the semi-fluid ice cream mix is dashed until it finally reaches a partly frozen mixture wherein the thickened consistency causes the load on the motor to increase and the motor approaches a stall condition. With the fan 120 speed reduced, as explained above, the freezer air flow rapidly drops off resulting in a cumulative effect that causes a rapid rise in motor temperature and consequently the thermostat temperature. This effect is represented by the steep slope of curve B, which during this sequence follows the solid line of curve A, and continues to rise until it reaches its opening setting of about 105° F. as indicated at point W' on the B curve.

At point W' further thermostat temperature rise is due entirely to the increase in motor temperature. Upon the thermostat 200' opening the resistor 210 of FIG. 13 is again placed in series with the motor windings 212, causing the voltage to fall below its normal 115 volts wherein the armature moves rearwardly clutching the dasher drive. Again, because the thermostat 200' is in contact with the heater 210 it drives or biases the thermostat temperature upwardly to overshood point X', shown on curve B at about 130° maximum overshoot. As with the first mode there is an offsetting factor because the fan 120 now is running at full speed cooling the motor so that the thermostat reaches the balance plateau of about 110° F. and will remain in this temperature range as long as unit is kept within the refrigerators, or until the user turns the switch 198 to OFF as indicated at point Y'. The curve B mode results in a fall-off of temperature to some point Z' which in the disclosed form is about 85° F. when thermostat 200' recloses and the system now is returned to a normal situation so it may be removed from the refrigerator, reloaded, if desired, with another mix of ice cream and a second batch made wherein the cycle of curve B would repeat itself.

For the embodiment disclosed in FIG. 13, the motor draws about 78 watts maximum and about 1.1 amps at its breakdown torque point on 117 volts of normal household current with the thermostat switch closed to contact 204 and the resistor 210 rated at 150 ohm (10 watt voltage dividing resistor). The circuit of FIG. 13 shows the ice cream maker in its initial "make" or dashing function in which the circuit is energized by the user turning the on-off switch 198 to its "on" or closed position with the thermostat temperature at approximately point "V" on curve A in FIG. 3. Power to the motor windings 212 flows through the normally closed dasher control motor temperature sensing thermostat 200. As the ice cream mix thickens the power required at the gear box output shaft 142 to drive the dasher 152 increases causing an increase in motor winding temperature. At a predetermined temperature, point W for curve A, the dasher control thermostat 200 bimetal movable contact 201 opens placing the resistor 210 in series with the motor windings 212. This reduces the magnetic stator force on the rotor windings 133 and allows the declutching spring 148 to withdraw the pinion 139 from spur gear 140 and terminate the rotation of output shaft drive 142. It will be appreciated, however, that the rotor 133 will continue to drive the fan 120 until switch 198 is manually opened at point "Y" (FIG. 3).

In normal use, the ice cream maker is installed in the refrigerator freezer compartment 34 having a temperature in the range of about −5° F. to +10° F. Under these conditions and with the ice cream maker in its "dashing" mode of operation, as shown in the FIG. 13 wiring diagram, the motor winding 212 is normally energized from electrical plug 214 via line 220, the off-on switch 198, line 222 and the normally closed bimetal switch 201 of the thermostat 200 (whose contacts will open on a rise to a predetermined temperature) and via line 216 to plug 214. Thus, full line voltage is applied to the motor windings 212 and the rotor 133 is drawn toward the stator causing the motor shaft pinion 139 to mesh with gear 140 and transfer torque from the speed reducing gears of gear box 141 to the linkage 150. The result is that the drive crank arm 189 rotates thereby oscillating the dasher drive arm 182.

In the modified form of the invention shown in FIG. 12 and its accompanying electrical schematic shown in FIG. 15, wherein like components have been given corresponding numbers, a dasher positioned switch means in the form of switch 226 is incorporated in the ice cream maker. Again, with the ice cream maker in its "dashing" mode of operation, the motor winding 212 is normally energized from $L_1$ via line 220, the off-on switch 198, line 222 and the normally closed contacts of the bimetal thermostat 200 and via line 216 to plug 214. In the same manner as described above the drive crank arm 189 rotates and oscillates the dasher drive arm 182, while at the same time causing dasher positioning switch 226 movable contact 227 to momentarily contact normally open fixed contact 235 providing current flow through line 225 resistor 228 to flash the neon ready light 229 off and on, alternately illuminating lens 186, while the rotor 133 drives fan 120 to pull air from the refrigerator freezer compartment through inlet 95. As the mix jells, the power required to operate the dasher increases and the motor temperature rises until it reaches a predetermined temperature, such as 70° F. and its contacts open. This places the voltage dropping resistor 210 in series with the motor windings which reduces the magnetic pull of the motor stator on the rotor and permits the declutching spring to move the rotor 133 axially out of the stator 138 far enough to disengage the pinion 139 from gear 140. It will be seen, however, this cannot occur until the dasher arm 182, as shown in FIG. 12, reaches a position placing the dasher 152 in a substantially vertical position in the mixing tray, and cam notch 230 on arm 182 pushes resilient blade 232 to depress switch 226 movable contact 234 which opens the normally closed (N.C.) contact 236 of switch 226, bypassing the voltage dropping resistor 210. This now is the "cooling" mode and the fan 120 will continue to operate, cooling the ice cream mix to a lower temperature, while the neon lamp 229 is energized continuously. In this mode the voltage dropping resistor's heat is utilized to hold the bimetal thermostat above its reclosing temperature, such as 40° F. as explained above.

The right side of FIG. 14 is an electrical schematic wiring diagram of the refrigerator cabinet 20. The lines $L_1$ and $L_2$ are connected to a conventional 115 volt household wiring system. The line $L_2$ side is connected by conductors 254 and 256 to the motor 258 of the compressor 50 while lines 260 and 261 connect the motor 258 through the coils of starting relay 262 and by conductor 264 through the thermostat cold control switch 266 to the receptacle wire 268 of freezer lamp 269 receptacle 270. The thermostat 266 is also connected by the line 272 to the evaporator fan motor 274, while the other side of the thermostat 266 is connected by line 276 of the fixed contact 278 of defrost timer 280. The movable contact 282 of the defrost timer, controlled by timer motor 284, is normally closed to its contact 278 except during the defrost cycle when it closes to defrost contact 286 energizing defrost heater 288 connected through defrost limiter switch 290 to the $L_2$ side of the power source. The ice cream maker circuit of FIG. 14 is energized by means of its electrical plug 214 being received in freezer lamp receptacle 270 connected by line 292 to freezer lamp door switch 294 the other side of which is connected by line 296 to line 252 to the $L_2$ side of the power source. It will be appreciated that applicant's circuit is operative such that during the defrost cycle the defrost timer 280 deenergizes the evaporator fan motor 274, compressor motor 258 and the ice maker.

FIG. 15 discloses an alternate circuit incorporating the positioning switch 226. In this modification with the normal switch 198 in its "off" position, the arrangement is such that the dasher 152 will stop in a substantially vertical position, such as shown in FIG. 7, switch 198 is moved to "off" during any part of its stroke. Thus, the dasher drive arm 182 cammed lobe portion 230 contacts the resilient switch arm of the switch 226 causing the switch to open only when the dasher is in its FIG. 7 position.

While the embodiments of the present invention constitute the preferred forms, it is to be understood that other forms might be adopted.

I claim:

1. A frozen confection-making appliance for use in the freezer compartment of a refrigerator cabinet, said appliance including a housing having a front freezing chamber and a rear machinery compartment, a front opening providing access to said chamber, a container for holding the confection to be congealed adapted for removable reception in said chamber, confection mixing means supported in said container, an electric motor disposed within said machinery compartment, said motor including an armature having first and second drive shaft portions, said armature movable axially responsive to variations in voltage supplied to said motor, said first shaft portion adapted to be connected to said mixing means by drive train means, means for declutching said first shaft portion from said mixing means, said second shaft portion being connected to fan means in said machinery compartment, longitudinally extending air passage means in heat exchange relation with said tray providing communication between freezing chamber air inlet means and said machinery compartment, said fan means operative for drawing freezer air through said air passage means and said machinery compartment for return to the refrigerator cabinet, a control circuit for said appliance comprising thermal switch means in series connection with said motor and responsive to open by sensing a predetermined temperature of said motor resulting from the confection attaining a partly frozen state, said circuit connecting resistor means in series with said motor and in parallel with said thermal switch means, whereby upon said thermal switch means operative to decrease the voltage supplied to said motor causing said armature to move axially whereby said first shaft portion is automatically declutched from said mixing means, and wherein the decreased voltage being of a quantity whereby said motor continues to drive said fan means to circulate below freezing air through said longitudinal passage and said machinery compartment for final freezing of the confection.

2. A frozen confection-making appliance for use in the freezer compartment of a domestic refrigerator, said appliance including a housing having a front freezing chamber and a rear machinery compartment separated by partition means, a front opening providing access to said chamber, freezer air inlet means in said front freezing chamber, a container for holding the confection to be congealed adapted for removable reception in said chamber, confection mixing means supported in said container, an electric motor disposed within said machinery compartment, said motor including an armature having first forwardly and second rearwardly extending drive shaft portions, said armature movable axially responsive to quantity variation in voltage supplied to said motor, said first shaft portion adapted to be connected to said mixing means by drive train means, means for declutching said first shaft portion from said drive train means, said second shaft portion being connected to fan means positioned in the aft portion of said machinery compartment, longitudinally extending air passage means formed between said tray and said housing providing communication from said freezer air inlet means to said machinery compartment, said fan means operative for drawing air from the freezer compartment into said inlet means and through said freezing chamber air passage means into said machinery compartment, a control circuit for said appliance comprising thermal switch means in series connection with said motor and responsive to open by sensing a predetermined temperature of said motor resulting from the confection attaining a partly frozen consistency, said circuit connecting resistor means in series with said motor and in parallel with said thermal switch means, said resistor means positioned in heat exchange relation with said thermal switch means, whereby upon said thermal switch means opening said resistor means operative to decrease the voltage supplied to said motor causing said first shaft portion to be automatically declutched from said drive train means resulting in the stoppage of said mixing means, said energized resistor means operative to bias said thermal switch means in its open position whereby said switch means is maintained at a predetermined temperature, such that said motor continues to drive said fan means to circulate below freezing air through said longitudinal passage and said machinery compartment to maintain the confection at its ultimate frozen consistency.

3. A frozen confection-making appliance for use in the freezer compartment of a refrigerator cabinet, said appliance including a housing having a chamber and a rear machinery compartment, a front opening providing acess to said chamber, a freezing tray for holding the confection to be congealed adapted for removable reception in said chamber, a confection mixing dasher having front and rear extensions adapted to be supported in tray journal means so as to be oscillatory about a substantially horizontal axis in said tray, an electric motor disposed within said machinery compartment, said motor including an armature having first and second drive shaft portions, said armature movable axially responsive to variations in voltage supplied to said motor, said first shaft portion adapted to be connected to said dasher by drive linkage means including a dasher drive arm, means for declutching said first shaft portion from said drive linkage means, said second shaft portion being connected to fan means in said machinery compartment, longitudinally extending air passage means in heat exchange relation with said tray providing communication between said front opening and said machinery compartment, said fan means operative for drawing freezer air through said front opening into said machinery compartment for return to the refrigerator cabinet, a control circuit for said appliance comprising thermal switch means and dasher positioning switch means, said thermal switch means in series connection with said motor responsive to open by sensing a predetermined temperature of said motor resulting from the confection attaining a partly frozen state, said circuit connecting resistor means in series with said motor and in parallel with said thermal switch means, said dasher positioning switch means in parallel connection with said resistor means operable when in its normally closed position to electrically bypass said resistor means, cam means on said dasher drive arm operative to open said dasher positioning switch each time said dasher is oscillated to a substantially vertical position, whereby upon both said thermal switch means and said dasher positioning switch means being in their open condition said resistor means operative to decrease the voltage supplied to said motor causing said armature to move axially, whereby upon said dasher reaching said substantially vertical position said first shaft portion is automatically declutched from said drive linkage means.

4. In combination a freezer-refrigerator having a cabinet defining a fresh food compartment and an adjacent freezer compartment separated by a partition wall, a refrigeration system including an evaporator to cool air circulated therethrough, and a forced air circulating system having an air passageway which includes a wall of said freezer compartment, said evaporator being disposed in said passageway so that the air passes over the evaporator, said passageway including an outlet opening in said freezer compartment and air outlet opening in said fresh food compartment, a frozen confection-making appliance in said freezer compartment, said appliance including a housing having a front freezing chamber and a rear machinery compartment, a front opening in said housing providing access to said chamber, a container for holding the confection to be congealed adapted for removable reception in said chamber, confection mixing means supported in said container, an electric motor disposed within said machinery compartment, said motor including an armature having first and second drive shaft portions, said armature movable axially responsive to variations in voltage supplied to said motor, said first shaft portion adapted to be connected to said mixing means by drive train means, means for declutching said first shaft portion from said drive train means, said second shaft portion being connected to fan means positioned in the aft portion of said machinery compartment, a longitudinally extending air passage in heat exchange relation with said tray providing communication between said housing front opening and air outlet means in said machinery compartment, said fan means operative for drawing freezer air through said housing front opening into said air passage and through said machinery compartment air outlet means into said refrigerator system passageway for exiting said fresh food compartment outlet opening, whereby its cooling capacity is utilized in said fresh food compartment, a control circuit for said appliance comprising thermal switch means in series connection with said motor and responsive to open by sensing a predetermined temperature of said motor resulting from the confection attaining a partly frozen state, said circuit connecting resistor means in series with said motor and in parallel with said thermal switch means, whereby upon said thermal switch means opening said resistor means operative to decrease the voltage supplied to said motor causing said armature to move axially whereby said first shaft portion is automatically declutched from said drive train means, and wherein the decreased voltage being of a quantity whereby said motor continues to drive said fan means to circulate below freezing air through said appliance longitudinal passage for final freezing of the confection, prior to the air being delivered to said fresh food compartment by said refrigerator air circulating system.

\* \* \* \* \*

UNITED STATES PATENT AND TRADEMARK OFFICE
CERTIFICATE OF CORRECTION

PATENT NO. : 3,988,902

DATED : November 2, 1976

INVENTOR(S) : James W. Jacobs

It is certified that error appears in the above-identified patent and that said Letters Patent are hereby corrected as shown below:

Col. 3, line 28, delete "over" (second occurrence); line 43, "87' " should read -- 84' --.

Col. 5, line 33, "positions" should read -- portions --; line 68 "152" should read --142--.

Col. 6, line 5, "or" should read -- of --.

Col. 7, line 51, "on" should read -- in --.

Col. 8, line 7, "100°" should read -- 110° --.

Col. 9, line 22, after "as" and before "unit" insert -- the --; line 23, "refrigerators" should read -- refrigerator --; line 52, delete "windings".

Col. 10, lines 38 and 39, "poistion" should read -- position --.

Col. 11, line 9, after "ice" insert -- cream --; line 54, after "means" insert -- opening said resistor means --.

Col. 12, line 44, before "chamber" insert -- front freezing --; line 46, "acess" should read -- access --.

Signed and Sealed this

Thirty-first Day of May 1977

[SEAL]

Attest:

RUTH C. MASON
Attesting Officer

C. MARSHALL DANN
Commissioner of Patents and Trademarks